Nov. 26, 1968   W. RUDBACH ET AL   3,412,861
PROCESS AND APPARATUS FOR SEPARATING LIQUIDS
Filed Aug. 7, 1964
Fig. 1b
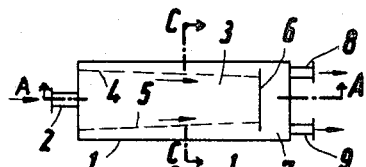
Fig. 1c
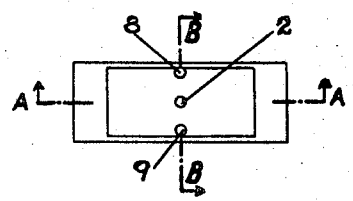
Fig. 1a
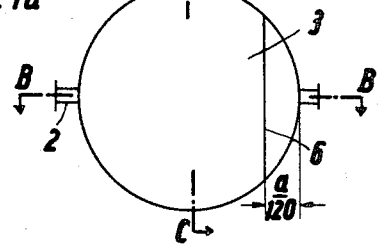
Fig. 1
Fig. 2b
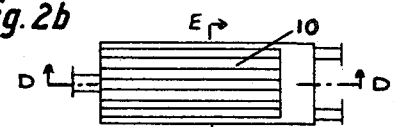
Fig. 2c
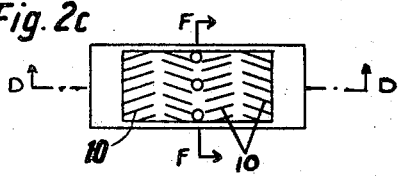
Fig. 2a
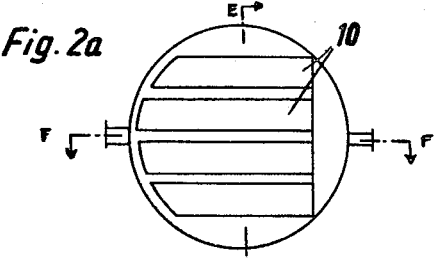
Fig. 2
Fig. 3b
Fig. 3c
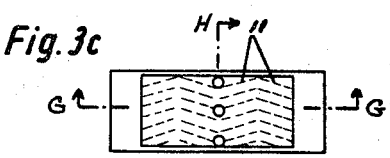
Fig. 3a
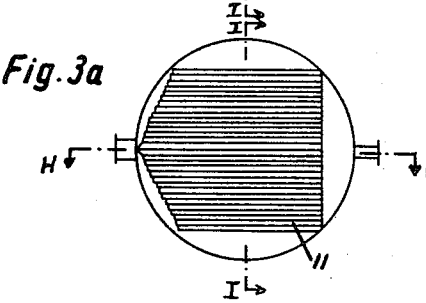
Fig. 3
Inventors
WOLFGANG RUDBACH
ECKART MÜLLER
HORST-LUDWIG REICHMARD
BY Bailey, Stephens & Huettig
ATTORNEYS

3,412,861
PROCESS AND APPARATUS FOR SEPARATING LIQUIDS

Wolfgang Rudbach, Griedel, Butzbach, and Eckart Müller and Horst Ludwig Reichhardt, Frankfurt am Main, Germany, assignors to Metallgesellschaft Aktiengesellschaft, Frankfurt am Main, Germany
Filed Aug. 7, 1964, Ser. No. 388,123
3 Claims. (Cl. 210—65)

The present invention relates to an improved process and apparatus for separating non-miscible or difficultly miscible liquids employing a packing or inner separation chamber structure which enables increased separation capability and output.

The problem of separating dual or multiphase mixtures into pure phases has been and is present in chemical technology. This is applicable primarily for extraction processes, but also for other processes, as, for example, steam distillation processes or synthesis in which a dual or multiphase mixture results as an intermediate or end product.

Various processes and apparatus are known for separating immiscible fluids, all of which rely upon a natural or artificial field of gravity or force for phase separation. In each case a determined or particular duration of time is necessary for achieving phase separation. This depends primarily on weight ratio of the phases, their viscosity, the droplet size and the total surface area. The minimum required duration for a given liquid mixture is therefore determined, with a prescribed temperature and given field of gravity, in the first sense by the desired sharpness of phase separation. In order to keep the time as short as possible and accordingly the output as high as possible it has in general been an object to construct the separator such that the required sharpness of phase separation before and during passage through the separator can be as low as possible, that is, the structure of the separator permits some mixing of the intermediate layers or middle layer with both of the phases to be separated, as long as there is a possibility of decanting or separating the pure heavy and pure light phases above and below the intermediate layer or layers.

These known separators and an embodiment of the process and apparatus of the invention are further described with reference to the accompanying drawings wherein FIGURE 1a is a horizontal view along A—A of FIGURES 1b and 1c of a known type of multiphase separator;

FIGURE 1b is a vertical sectional view along B—B of the known separator of FIGURE 1a;

FIGURE 1c is a sectional view of the known separator along C—C in FIGURES 1a and 1b;

FIGURE 2a is a horizontal sectional view along D—D of FIGURES 2b and 2c of a separator employing a type of separator sheet or strips to aid separation;

FIGURE 2b is a vertical sectional view along F—F of the separator shown in FIGURES 2a and 2c;

FIGURE 2c is a sectional view of the separator of FIGURES 2a and 2b along E—E;

FIGURE 3a is a horizontal sectional view of an embodiment of the invention along G—G of FIGURES 3b and 3c;

FIGURE 3b is a vertical sectional view of the embodiment of FIGURES 3a and 3c along H—H; and FIGURE 3c is a sectional view of the embodiment shown in FIGURES 3a and 3b along I—I.

In employing the separator of FIGURES 1a, 1b and 1c, the fluid mixture to be separated is introduced into the separator 1 through inlet 2 and passed through the separator in the direction of the arrows given in FIGURE 1b. A creaming or a depositing of the light and heavy phases occurs on the interfaces 4 and 5 about along the dotted lines also given in FIGURE 1b. The pure light phase is present only on the upper surface 4 and the pure heavy phase only on the surface 5 below. The pure phases pass respectively above and below the separating surface 6 into take off chamber 7 from which they are separated through removal lines 8 and 9. This separator is effective only if the surface 4 is below the upper edge and surface 5 above the bottom edge of separating surface 6. This is assured only if the apparatus is supplied with a mixture which does not have too many phases. The maximum output is therefore limited by the speed with which it separates the phases so far as the thickness of the middle layer does not exceed a prescribed value.

It is already known to install separator sheets 10 in the separation chamber in order to improve phase separation and increase output. This type of apparatus is illustrated in FIGURES 2a, 2b and 2c. The object of these sheets or plates is first of all to minimize the height of fall of the drops. An actual improvement of phase separation can be achieved with this means, however an increase of output achievable therewith remains within proportionally modest limits. This is especially applicable if the separator is to be as flat as possible, as it is desired, for example, for a column type multistep mixer and separator.

The present invention now provides a method and apparatus which improves phase separation many times and, even in very flat separators, enables an increase in output of more than about 100%.

The invention moreover is based on the surprising perception that a much greater improvement of the separating effect can be achieved by providing the prerequisite effecting rapid enlargement of the drops than is possible by diminishing the height of fall. Since the drop size in the mixture to be separated is generally given in advance, since an object before phase separation, in order to improve material exchange, is to provide as small a drop size as possible, this drop enlargement is effected initially in the separator.

It was also found that this drop enlargement can be achieved in a very simple and reliable manner by passing the mixture to be separated over as many sharp edges and points as possible. In carrying out the invention, however, an adequate cross-section of free space within the separation chamber must be provided for passage of the fluid between the bodies which have these sharp edges and/or points. The separating chamber packed with such sharp edged bodies accordingly has about 50 to 99% of its total space free to permit flow of the liquid through the separator.

The improved separation and increased output is achieved according to the invention by providing a packing of sharp edged bodies within chamber 3, the dimension in at least one direction of such bodies exceeding their dimension in another direction at least three times, preferably several times, e.g., 10 times to 100 times. The packing according to the invention is provided so that these bodies have at least 1 centimeter and a maximum of 100 centimeters of sharp long edge for each square centimeter of upper surface. The preferable range is 10–25 centimeters for each square centimeter of upper surface and especially the range of 15–20 centimeters per square centimeter, since the advantageous effect of the sharp edges is achieved extensively within this range and exceeding this ratio does not improve the separating effect. On the other hand, a packing having an especially high ratio of sharp edges to upper surface is not as simple to produce, especially if reduction of the cross-section of free space within the chamber is to be avoided.

The simplest embodiment of the invention comprises filling the separating chamber 3 with sharp edged steel wool, metal turnings or the like. A web or fabric of sharp edged filaments about 0.5–2 millimeters wide, as is used, for example, in cleaning metal objects, may be used.

Packing the separation chamber 3 with a like amount of round wire or fabric made of such wire does not give the same separation effect. The separating effect of an apparatus and process using a packing of round wire is scarcely different from that achieved without any packing.

Another embodiment of the invention comprises using a series of spaced narrow or thin metal strips 11 which are preferably arranged in such a manner that they simultaneously reduce the height of fall and provide the effects set out above. This embodiment of the invention is illustrated in FIGURES 3a, 3b and 3c.

The width of strips 11 according to this embodiment of the invention must not exceed 2 centimeters and preferably not exceed 1 centimeter in order to come within the required range of at least 1 centimeter in length of sharp edge per square centimeter of upper surface of the packing bodies.

A further embodiment of the invention, not shown in the drawings, comprises packing the separation chamber 3 with sharp edged filler bodies, preferably curved around two dimensions, such as curved pieces of glass, ceramic fragments and the like.

The invention is further illustrated and described in the following example.

*Example 1*

The following separation was carried out in a separator like the one shown in FIGURES 1a, 1b and 1c employing a packing consisting of metal turnings averaging 50 millimeters long and 3 millimeters wide. The separator had an inner diameter of 800 millimeters, was 300 millimeters high and the separating surface 6 was a distance of 120 millimeters from the discharge lines. A test mixture of 10% by volume technical pentane, 40% by volume coke oven benzene containing 90% aromatics and 50% by volume of an extraction agent were used. The extraction agent consisted of N-methyl pyrrolidone containing 17% water.

The interfacial tension of this mixture totaled 0.1 dyne per centimeter and the difference in density 0.113 gram per milliliter. The two phases were employed in a volume ratio of 55 parts heavy phase including the extraction agent to 45 parts of light phase including the non-aromatic hydrocarbons.

The permissible mixture layer height in chamber 3 of 250 millimeters was determined as permissible since the height of the separating surface was 260 millimeters.

Without a packing this mixture layer height can be maintained up to a surface charge or capacity of 9.4 cubic meters per square meter of height (total amount passed through in cubic meters per unit of height in regard to area of the separator in square meters). By constructing the separation chamber according to FIGURES 2a, 2b and 2c, this capacity can be increased to 12.2 cubic meters per square meter of height, which corresponds to an increase in capacity of 30%.

However, employing the packing of metal turnings caused an increase in capacity to 20.8 cubic meters per square meter of height without exceeding the permissible height of the mixture layer.

When a packing of commercial pan scourer, that is, a loose fabric consisting of sharp edged metal filaments having a width of 1–2 millimeters, was used the capacity was increased to 22 cubic meters per square meter of height.

We claim:

1. In a process for separating the phases of a liquid multiphase mixture by introducing the mixture in a separating chamber and removing the separated liquid phase from said chamber, the improvement comprising passing the mixture through the chamber in contact with a packing of sharp edged bodies contained in the chamber wherein each of the sharp edged bodies has a length at least three times as great as the width, and wherein the area of the upper surface of each sharp edged body is one square centimeter for each 10 to 25 centimeters of sharp edge of the body, and removing the resulting heavy and light phases.

2. A process as in claim 1 wherein the packing occupies about 10 to 50% of the separating chamber space and about 50 to 90% is free to permit the mixture to flow through the chamber.

3. An apparatus for separating the phases of a liquid multiphase mixture comprising a separation chamber, an inlet means to the chamber to feed the multiphase mixture into one end of the chamber, a packing of sharp edged packing bodies disposed within the separation chamber in the path of the multiphase mixture and filling about 10 to 50% of the chamber space, each body having a length at least three times as great as great as the width, wherein the area of the upper surface of each body is one square centimeter for each 10 to 25 centimeters of sharp edge of the body, a wall at the end of the chamber opposite the inlet, spaces above and below the wall to permit the passage of the lighter phases of the mixture above and the heavier phases below the wall, a take off chamber at the end opposite the inlet separated from the separating chamber by the wall, and outlets leading from the take off chamber to remove the resulting pure lighter and heavier phases.

References Cited

UNITED STATES PATENTS

| | | | |
|---|---|---|---|
| 1,774,232 | 8/1930 | Hartwell | 210—500 X |
| 1,860,111 | 5/1932 | Miller | 210—500 X |
| 1,873,597 | 8/1932 | Jones | 210—23 |
| 2,093,311 | 9/1937 | Craig | 210—500 X |
| 2,224,624 | 12/1940 | Adams et al. | 210—500 X |
| 2,597,475 | 5/1952 | Grise | 210—23 X |
| 2,609,099 | 9/1952 | Griswold | 210—23 X |
| 2,629,654 | 2/1953 | Olney | 23—310 |
| 2,731,150 | 1/1956 | McCann | 210—23 X |
| 2,905,323 | 9/1959 | Megesi | 210—130 |
| 3,247,104 | 4/1966 | Sako et al. | 210—23 X |

REUBEN FRIEDMAN, *Primary Examiner.*

J. L. DE CESARE, *Assistant Examiner.*